(No Model.)
H. NESSON.
STOOL.
No. 469,358. Patented Feb. 23, 1892.
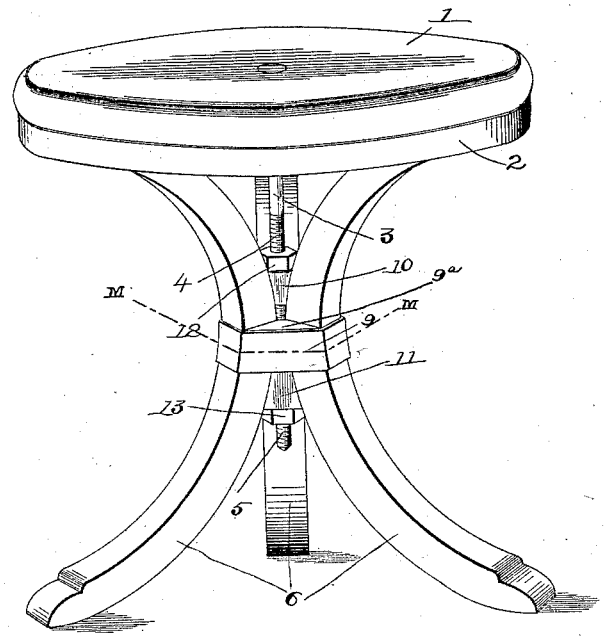
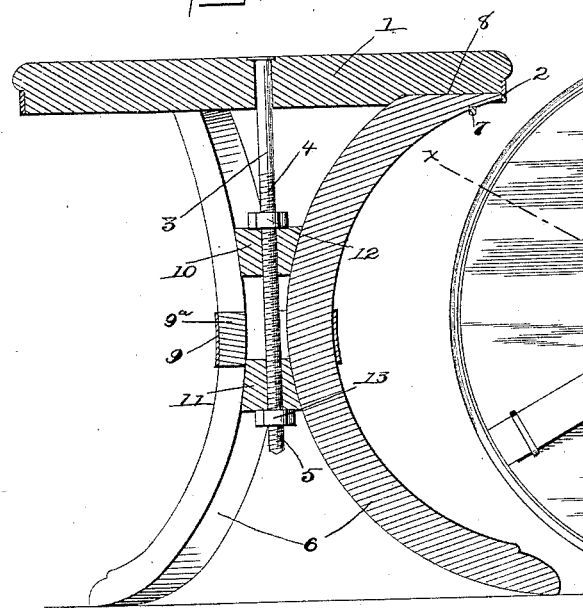
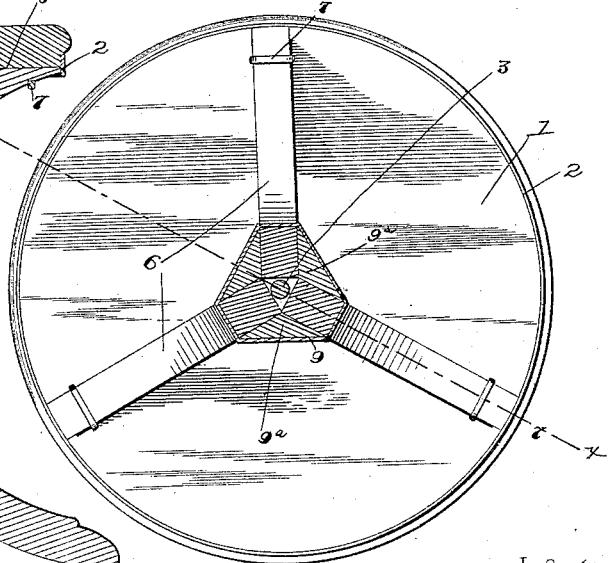
Witnesses
E. S. Duvall Jr.
H. F. Riley
Inventor
Henry Nesson.
By his Attorneys,
C. A. Snow & Co.

UNITED STATES PATENT OFFICE.

HENRY NESSON, OF BRISTOL, SOUTH DAKOTA.

STOOL.

SPECIFICATION forming part of Letters Patent No. 469,358, dated February 23, 1892.

Application filed October 31, 1890. Serial No. 369,890. (No model.)

*To all whom it may concern:*

Be it known that I, HENRY NESSON, a citizen of the United States, residing at Bristol, in the county of Day and State of South Dakota, have invented a new and useful Stool, of which the following is a specification.

The invention relates to improvements in stools.

The object of the present invention is to provide a simple and inexpensive stool adapted for milking, camping purposes, and the like.

The invention consists in the construction and novel combination and arrangement of parts hereinafter fully described, illustrated in the accompanying drawings, and pointed out in the claims hereto appended.

In the drawings, Figure 1 is a perspective view of a milking or camp stool embodying the invention. Fig. 2 is a vertical section on the line $x\,x$ of Fig. 3. Fig. 3 is a horizontal section on the line M M of Fig. 1.

Referring to the accompanying drawings, 1 designates a circular seat provided at its periphery with a sheet-metal band 2 and having depending centrally from it a stem 3, which is provided with screw-threads extending from the lower end 5 to a point at 4, and arranged on opposite sides of the central portion to which are secured the curved legs 6. The legs are approximately semicircular and have their upper ends abutting against the metal band 2 and secured to the seat by a staple 7 and arranged in recesses 8 in the lower face of the seat, and the said legs are secured intermediate of their ends to the stem 3 by a ring or band 9 and by blocks 9ª. Arranged on the stem above and below the point of attachment of the legs are pyramidal washers 10 and 11, which are provided with curved faces to receive the curved legs and are held against the same in the angle formed by them by nuts 12 and 13, engaging the threaded portion of the stem. By this arrangement of nuts and washers the legs are retained in their proper position.

The curved legs are centrally and rigidly secured in the retaining-band by the pyramidal washers which engage the inner faces of the legs and spread them and force them against the band and which are operated by the nuts 12 and 13.

It will be seen that the stool is simple and comparatively inexpensive in construction and is adapted for use as a milking-stool, camp-stool, or the like.

What I claim is—

A stool comprising the seat, the centrally-arranged threaded stem depending from the seat, the semicircular legs secured to the seat, the band passing around the legs, the tapering washers arranged above and below the band and adapted to spread the legs, and the nuts arranged on the stem and adapted to force the washers against the legs, substantially as described.

In testimony that I claim the foregoing as my own I have hereto affixed my signature in presence of two witnesses.

HENRY NESSON.

Witnesses:
Mrs. R. G. HANT,
M. A. HALL.